United States Patent
Lamy-Bergot et al.

(10) Patent No.: US 8,284,846 B2
(45) Date of Patent: Oct. 9, 2012

(54) METHOD FOR SHAPING FRAMES OF A VIDEO SEQUENCE

(75) Inventors: Catherine Lamy-Bergot, Paris (FR); Cyril Bergeron, Paris (FR)

(73) Assignee: Thales, Neuilly sur Seine (FR)

( * ) Notice: Subject to any disclaimer, the term of this patent is extended or adjusted under 35 U.S.C. 154(b) by 738 days.

(21) Appl. No.: 11/573,552

(22) PCT Filed: Aug. 9, 2005

(86) PCT No.: PCT/EP2005/053911
§ 371 (c)(1),
(2), (4) Date: Oct. 30, 2008

(87) PCT Pub. No.: WO2006/015979
PCT Pub. Date: Feb. 16, 2006

(65) Prior Publication Data
US 2009/0052550 A1    Feb. 26, 2009

(30) Foreign Application Priority Data
Aug. 10, 2004  (FR) ...................................... 04 08802

(51) Int. Cl.
*H04N 7/12* (2006.01)
*H04N 11/02* (2006.01)
(52) U.S. Cl. ................................. 375/240.26; 375/240.1
(58) Field of Classification Search .................. 375/240
See application file for complete search history.

(56) References Cited

U.S. PATENT DOCUMENTS
2004/0179619 A1 * 9/2004 Tian et al. ................ 375/240.26
2005/0254575 A1 * 11/2005 Hannuksela et al. ...... 375/240.1

FOREIGN PATENT DOCUMENTS
EP         1 406 450 A      4/2004

OTHER PUBLICATIONS

Marek Domanski, Lukasz Blaszak, Slawomir Mackowiak: "AVC Video Coders With Spatial and Temporal Scalability" Proceedings of PVS 2003, Saint-Malo, Frnace, Apr. 2003, pp. 1-6, XP002332616.
Blazak L et al: "Scalable Video Compression for Wireless Systems" Mar. 14, 2002, Proceedings of URSI. Natinal Symposium of Radio Science, pp. 336-340, XP001205212.
Conklin G J et al: "A Comparision of Temporal Scalability Techniques" IEEE Transactions on Circuits and Systems for Video Technology, IEEE Inc. New York, US, vol. 9, No. 6, Sep. 1999, pp. 909-919, XP000848855.

* cited by examiner

*Primary Examiner* — Sath V Perungavoor
*Assistant Examiner* — Xiaolan Xu
(74) *Attorney, Agent, or Firm* — Lowe, Hauptman, Ham & Berner, LLP

(57) ABSTRACT

Procedure and device for shaping frames of a video sequence or group of pictures GOP using a mixing table adapted for arranging the frames of the highest importance regularly while leaving intervals between them, filling the intervals with frames of lesser importance, and coding the new sequence thus obtained.

17 Claims, 6 Drawing Sheets

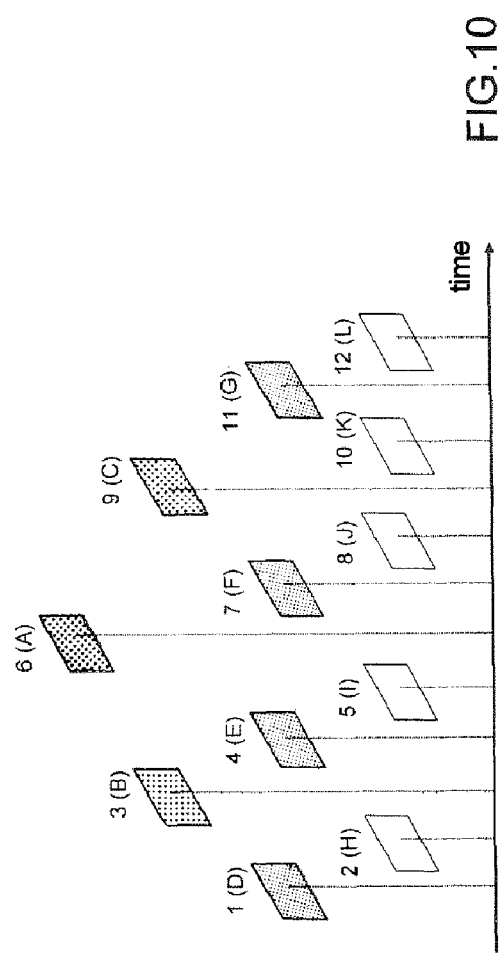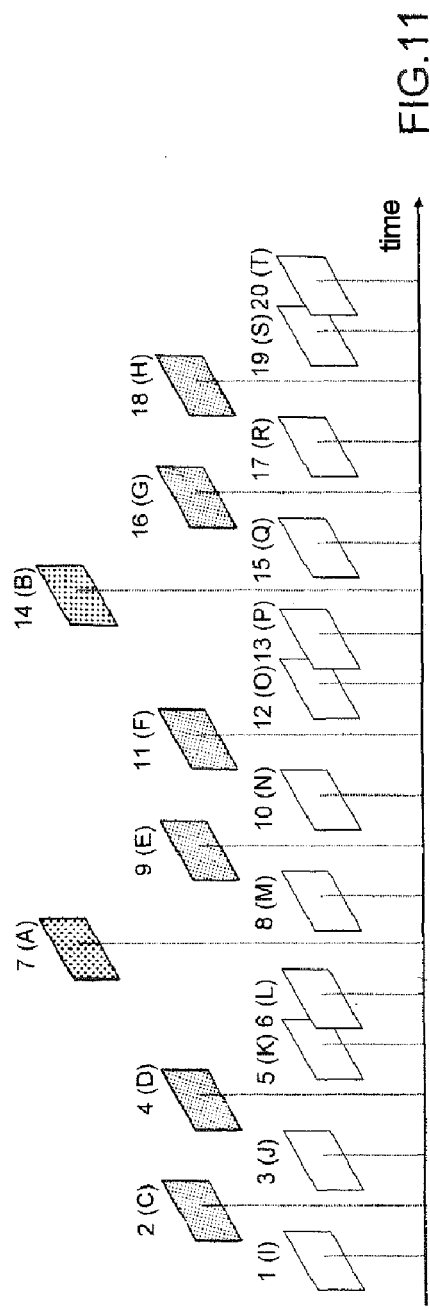

METHOD FOR SHAPING FRAMES OF A VIDEO SEQUENCE

RELATED APPLICATIONS

The present Application is based on International Application No. PCT/EP2005/053911, filed Aug. 9, 2005, which in turn corresponds to French Application No. 04/08802 filed on Aug. 10, 2004 and priority is hereby claimed under 35 USC §119 based on these applications. Each of these applications are hereby incorporated by reference in their entirety into the present application.

The invention relates to a method for shaping frames of a video sequence so as to obtain temporal granularity (otherwise known as scalibity).

Subsequently in the description, the term "granularity" will designate the capacity of a video stream to be decoded by choice with a greater or lesser fineness. The word "frame" or "image" will be employed interchangeably to designate one and the same object.

The invention applies for example in the context of the H.264/MPEG-4 AVC standard.

Granularity in a Video Standard.

Figure 1:
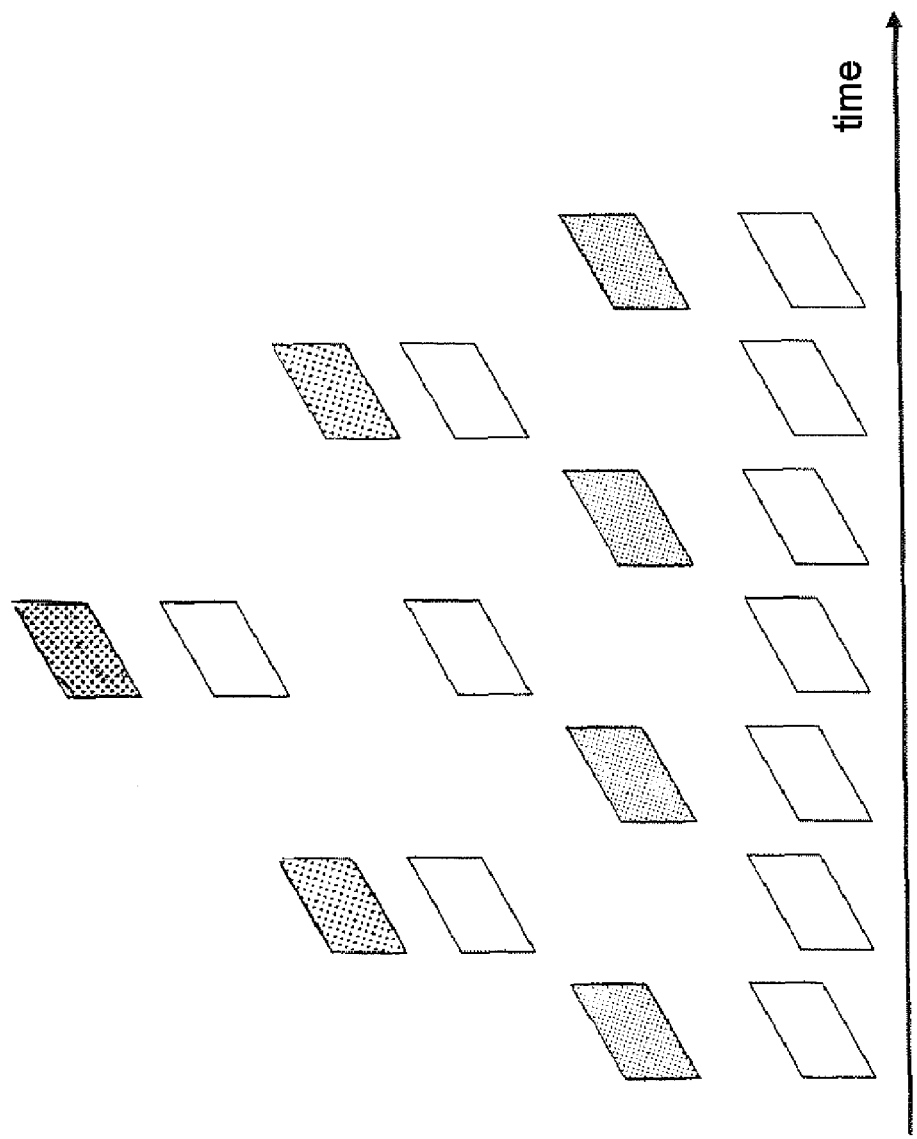

A data stream compressed according to a procedure ensuring granularity, referred to as "a scalable compressed bitstream", contains several nested subsets. Each of these subsets represents the initial video content for a particular spatial resolution (leading to variations in the size of the image), a temporal resolution (leading to variations in video frame bit rate) or a resolution in terms of visual quality (leading to variations in the quantization parameters). Each of these subsets is assumed to correspond to an effective compression of the information that it contains. FIG. 1 shows diagrammatically an example of temporal granularity.

The benefits of granularity are multifold. With granularity, it is possible to meet various requirements or capacities without requiring a re-evaluation of the conditions of transmission at each instant. In particular, from the viewpoint of the coder, the benefit is that the video can be compressed once, so as to be used later at various bit rates; from the viewpoint of the provider of services, the benefit resides in the possibility of switching to a different bit rate according to the bandwidth capacities of the link, and from the viewpoint of the user, the benefit resides in the fact that the latter can easily change his requirements and his demand in real time to adapt it to the current requirements. In a context of wireless communication, where the bandwidth and the useful bit rate available can change rapidly on account of the channel transmission conditions, of the existing network for transmission and of the possible presence of other users and of interference, the "capacity to offer granularity" is currently becoming an important property.

H.264/MPEG-4 AVC

Studies at the level of the video coding experts group (VCEG) of the ITU-T were begun in 1999 to establish a new video standard capable of offering more effective compression than the existing solutions, while presenting a reasonable complexity level for its implementation and ultimately be easily usable for network applications, in particular wireless networks and the Internet. The MPEG consortium has proposed to the VCEG experts group the creation of a partnership to establish a common standard, designated under the name H.264 or MPEG-4 AVC (advanced video coding). The final version of the document ITU JVT-G050 only specifies the aspects of the video coding.

At present time, the main applications of the H.264 standard are:
real-time duplex voice services, for example videoconferencing over cable or wireless networks (such as the UMTS Universal Mobile Telecommunication system), with a bit rate of less than 1 Mb/s and a small time lag;
good quality and high quality video services for satellite, xDLS, or DVD broadcast transmission ("streaming"), where the bit rate lies between 1 and 8 Mb/s and the time lag may be significant;
lower quality streams for video services with a lower bit rate such as Internet applications (with a bit rate of less than 2 Mb/s and a time lag which may be significant).

Figure 2:
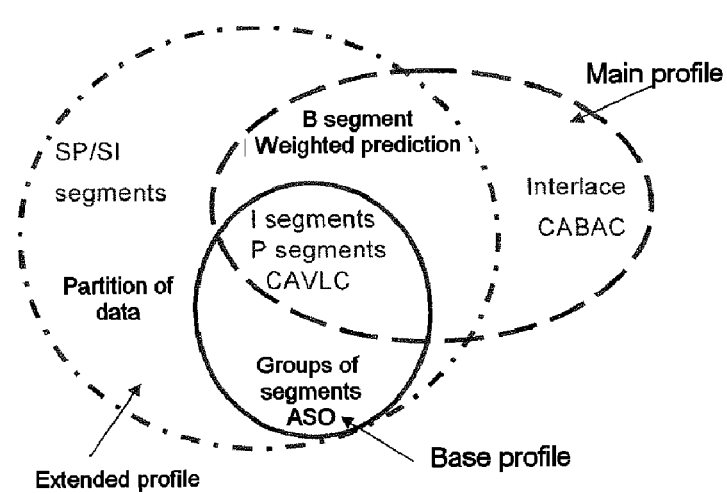

FIG. 2 represents the three profiles defined by the H.264 standard and the principal tools implemented for each profile:
The base profile or Baseline, which is particularly well suited to videoconferencing, video over IP and mobility applications. It only integrates coding by I (Intra) and P (predicted) frames or segments and a few error protection tools.
The "principal" or Main profile which is suited to television and to video broadcasting and applications with significant time lag. It integrates in particular an interlaced mode (for TV applications), B frames, arithmetic entropy coding.
The "extended" or "X" profile which is suited to "streaming" over various channels, in particular wireless channels. It integrates in particular bit-rate adaptive solutions and error protection tools.

The H.264 standard, although appearing to be beneficial and able to replace other better known standards, presents a few major drawbacks when it is used in variable-channel applications: it does not in fact comprise any capacity of "granularity", apart from the possible use of the B frames in the principal profile or the extended profile for temporal granularity.

Numbering of the Frames and Order of Decoding

There currently exist two solutions for numbering the video frames in the H.264/MPEG-4 AVC standard.

The first solution, which relies on "frame number" (or "frame_num") corresponds to the order of decoding of the access units in the stream. This parameter is decoded on the basis of each header of an image segment and increases in the order of decoding of the access units. It does not necessarily indicate the final order of display that the decoder will use.

The second solution customarily designated by the term "POC" for image appearance number or "Picture Order Count" corresponds to the order of display of the decoded frames (or fields) which will be used by the decoder. It is obtained as follows:
Each coded frame is associated with two POC parameters corresponding respectively to a top field appearance number and to a bottom field appearance number designated "topfieldordercnt" and "bottomfieldordercnt",
Each coded field is associated with a parameter "POC", called for a top field "topfieldordercnt" and for a bottom field "bottomfieldordercnt".

The difference between the two parameters, top appearance number "top order count" and for the bottom appearance number "bottom order count" is given by the parameter "delta_POC bottom" which by default is equal to zero. In practice, with noninterlaced modes, the difference Delta_Poc_bottom is equal to zero.

The current H.264 standard makes it possible to obtain the POC value for three types:
type 0: the POC parameter is explicitly dispatched in each header part, type 1: the POC parameter depends on the order of decoding (frame_num) and on the increments indicated in the sequence of the adjustment parameters, with a difference dispatched only if there is no expected change in the order, type 2: the order of display is the same as the order of decoding.

The method according to the invention modifies in particular the value of the POC parameter, it therefore uses type 0.

For the other 2 types (1 and 2), the order of display is directly or indirectly derived by the frame number or "frame_num".

In the case of the standard, the parameter TopFieldOrderCnt (TopFOC) of type 0 is obtained as follows: TopFieldOrderCount=POCMsb+POCLsb where the letters Msb correspond to the most significant bit and the letters Lsb to the least significant bit, where POCLsb is dispatched in each header of a subpart or segment of the image and where the parameter POCMsb is incremented when the parameter POCLsb attains its maximum value.

An exemplary arrangement result for the order of display obtained by rearrangement of the POC is given in table 1

| N° | frame#Type | POC_lsb | TopFOC | order of appearance |
|---|---|---|---|---|
| 0 | I | 2 | 2 | 2 |
| 1 | P | 3 | 3 | 3 |
| 2 | P | 1 | 1 | 1 |
| 3 | P | 4 | 4 | 4 |
| 4 | P | 0 | 0 | 0 |
| 5 | I | 0 | 0 | 5 |
| 6 | P | 3 | 3 | 8 |
| 7 | P | 1 | 1 | 6 |
| 8 | P | 2 | 2 | 7 |
| 9 | I | 0 | 0 | 9 |

Multiple and Distant Reference

Contrary to the previous video coding standards which were used in simple reference mode, that is to say where the appearance prediction is made only by using a given preceding image, the H.264 standard makes it possible to use up to 32 different frames as references for each P segment (or P-slice) and up to 64 different frames for each B segment (or B-slice). The images which are coded and decoded, and available to serve as references are stored in a memory containing the decoded images (DPB standing for decoded picture buffer). They are referenced either as an image with near reference better known by the expression "short term picture reference", indexed as a function of the PicOrderCount, or as an image with distant reference, better known by the expression "long term picture reference", indexed as a function of the distant reference image counter LongTermPicNum. When the DPB memory is full, only the oldest term with near reference is removed from the memory. The "Long term" references are not eliminated, except by an explicit command in the bit stream.

The invention relates to a procedure for shaping frames of a video sequence or group of pictures GOP characterized in that it comprises at least the following steps:
using a mixing table adapted for
  arranging the frames of the highest importance regularly while leaving intervals between them,
  filling the intervals with frames of lesser importance, and
  coding the new sequence thus obtained.

The invention presents notably the advantage of being entirely compatible with the H.264/MPEG-4 AVC standard. The H.264 standard can use the proposed temporal granularity mode without having to adapt currently standardized functionalities, and can do so for all the profiles defined, in particular for the base profile. By using the present invention, an H.264 coder will offer the temporal granularity performance at reduced costs or without cost in terms of redundancy in comparison with a data stream unable to offer granularity, better known by the expression "non-scalable codestream".

Figure 3:
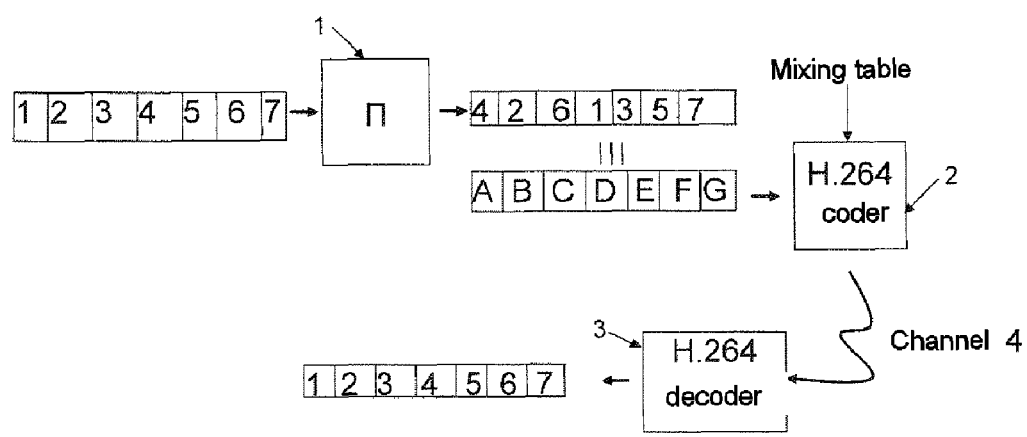
Figure 4:
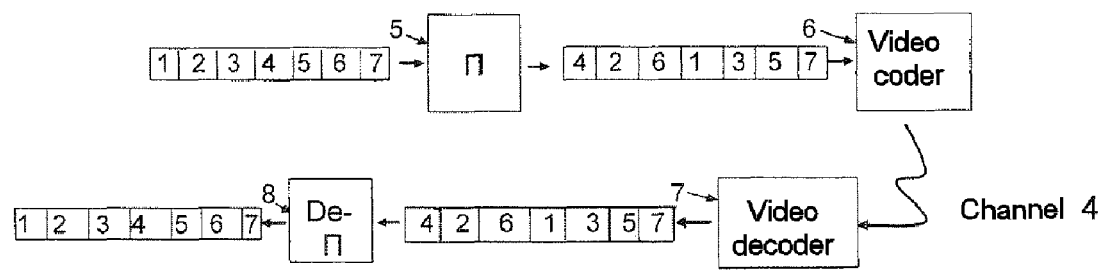
Figure 5:
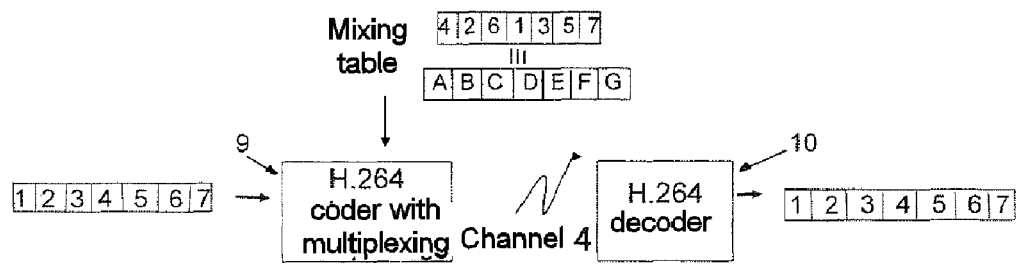
Figure 6:
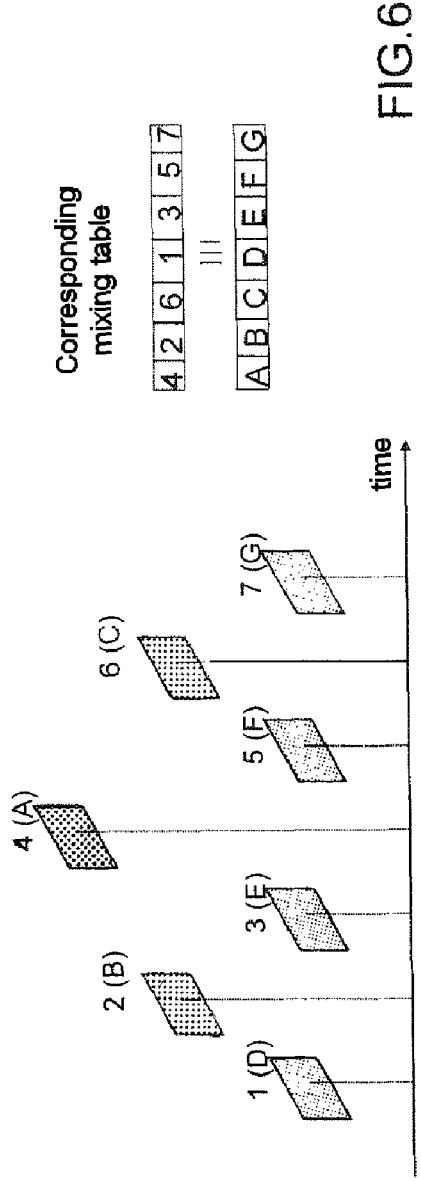
Figure 7:
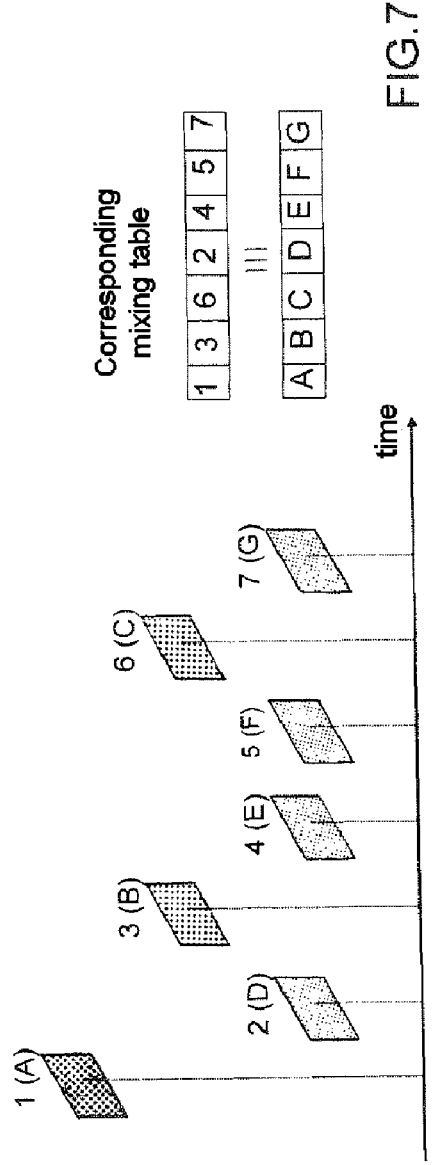
Figure 8:
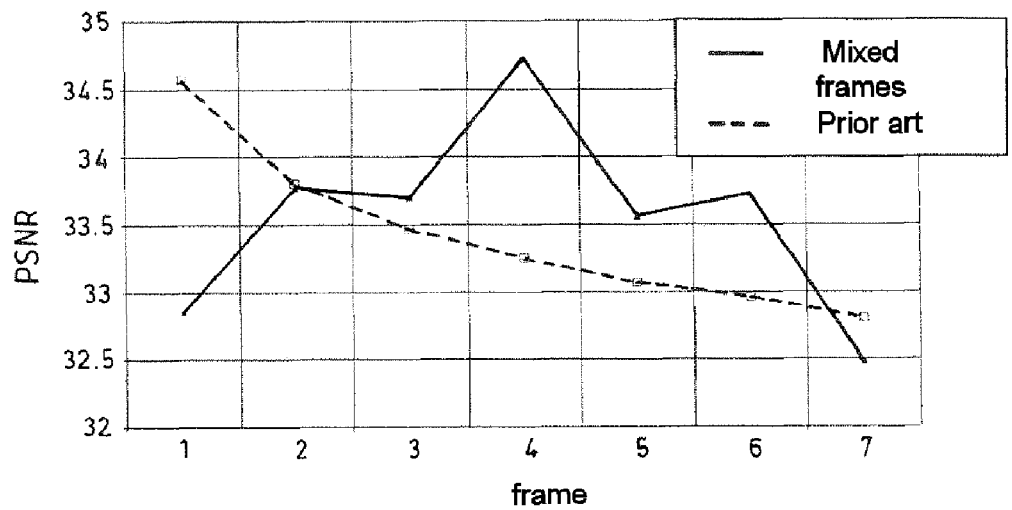
Figure 9:
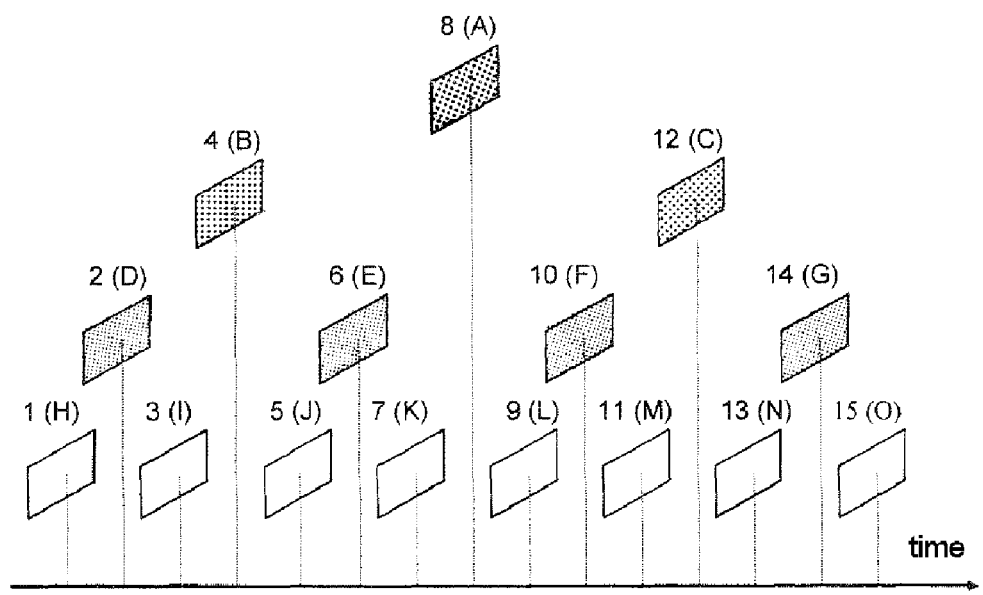

Other characteristics and advantages of the present invention will be better apparent on reading the description which follows of an example given by way of wholly nonlimiting illustration together with the figures which represent:

FIG. 1 an illustration of temporal "granularity",

FIG. 2 the existing profiles of the H.264 standard,

FIGS. 3, 4 and 5 three alternatives of implementation of the method,

FIGS. 6, 7 two examples of a case of group of pictures comprising 7 frames,

FIG. 8 a comparison of the visual rendition obtained with methods according to the prior art or with the method according to the invention, FIGS. 9, 10 and 11 examples of applying the procedure for groups of pictures of different size.

The invention relies notably on the use of the two systems of frame numbering proposed by the H.264 standard, the first to effectively code the data and the second to transmit the data according to the refinement level in the video sequence. The principle consists notably in mixing the frames, by rearranging the most important frames (frames which will be decoded for the lowest bit rates) in a regular manner and in filling the intervals between the most important frames with the frames of lesser importance (frames which will be decoded only with the frames of highest bit rate) and in coding this new sequence as if it were a conventional sequence. This mixing mode makes it possible firstly to obtain a temporal granularity and a recursive prediction without requiring the use of B frames and second to position the reference frames in a regular manner in the sequence (including the first intra frame). This can lead to a gain in compression and a gain in visual restitution (or "rendering") in the case of masking (or "concealment"), as the frames are systematically nearer than their reference.

Temporal Granularity through the Rearrangement of the Frame

As mentioned above, a video coding algorithm with temporal granularity allows the extraction by the video decoder of sequences with various temporal resolutions on the basis of an initial binary stream. To allow such a "granularity", as illustrated in FIG. 1 in a group of pictures or GOP, several importance levels are defined, each corresponding to a number of consecutive frames which can be decoded as a group independently of the remainder of the video sequence.

In FIG. 1, three importance levels are represented, the base level with a low bit rate data stream, a first refinement level with three medium bit rate frames or images, and a second refinement level for high bit rate frames.

The temporal granularity is thus obtained by decoding a greater or lesser number of subsets of the GOP. In practice, if the variable importance levels are distributed over time in an equal or substantially equal manner, the natural temporal granularity leads to the associating of the bit rate of images with the number of decoded subsets.

The method according to the invention consists in particular in introducing the characteristic of temporal granularity for a data stream coded according to a procedure which does not make it possible a priori to obtain granularity ("a priori nonscalable codestream") by rearranging the frames in a group of pictures GOP in such a way that they are distributed as regularly as possible. The most important frames (which will correspond to the decoded frames of the lowest bit rate) are regularly distributed (in the temporal sense) in the frame. The spaces thus formed between these frames receive the frames of lesser importance. The frames termed of lower importance correspond to those which are in the various refinement levels, The expression "importance level" is designated here to mean frames which for example can be coded with a lower level of accuracy (corresponding in particular to higher quantization parameters).

The thus reordered sequence can thereafter be coded in a conventional manner, for example by an H.264/MPEG-4 AVC type coder and decoded thereafter by the decoder of the same standard.

A possible regular distribution can correspond to the positioning of the intra frame or I frame in the middle of the group of pictures and to a regular distribution of the other predicted frames or P frames.

Total or quasi total compatibility is obtained on the decoder side by forcing the coder to use the initial order of decoding as POC values.

Various alternative implementations of the procedure according to the invention can be carried out, of which three are given by way of wholly nonlimiting illustration. They are shown diagrammatically in FIGS. 3, 4 and 5.

FIG. 3 shows diagrammatically an alternative where the operation of rearranging the frames is applied directly to the video sequence with the aid of interlacing means Π or 1 preceding the H.264 coder. For example, in this figure the group comprises 7 images numbered 1, 2, 3, 4, 5, 6 and 7 (sequence S1) which are reordered after the first step of interlacing into a sequence S2=4, 2, 6, 1, 3, 5 and 7 corresponding in the figure to the renumbering A, B, C, D, E, F, G. The H.264 coder codes this sequence S2, for example between taking as Intra frame A and by predicting the other 6 by means of P frames corresponding to B, . . . , G. The coder also receives information from the rearrangement or interlacing table used, to allow the insertion of the correct order of decoding into the POC fields. The H.264 code stream transmitted by way of the transmission channel 4 is totally compatible with the standard and directly decoded by any decoder 3 compatible with the H.264/MPEG-4-AVC standard. This version has the advantage of being implemented directly with an H.264 decoder with a minor modification of the coder.

FIG. 4 represents another alternative embodiment where the operation of rearranging the frames is applied directly to a video sequence S1=1, 2, 3, 4, 5, 6 and 7 with interlacing means 5 to give a sequence S2=4, 2, 6, 1, 3, 5 and 7. The sequence S2 is coded by a video coder 6, for example of H.264 type, which is not modified during normal operation. The coded stream S'2 is thereafter transmitted by the channel 4 and decoded by any standard video decoder 7. After decoding, the sequence passes through deinterlacing means 8 so as to retrieve the initial sequence S1. This alternative implementation has the advantage of being applicable to any video coder, but the drawback of requiring a modification on the sender side and on the receiver side by the insertion of an interlacing and deinterlacing device.

FIG. 5 shows diagrammatically another alternative implementation where the operation of rearranging the frames is performed on the video sequence to be coded within a modified coder 9 adapted for performing the interlacing operation and which knows the mixing table used. The thus modified H.264 coder performs the coding of the video sequence S1. During the coding operation, according to the order specified by the mixing table, the initial order of decoding is inserted into the POC fields. The coded sequence is received after transmission by the transmission channel before being decoded by any decoder 10 compatible with the H.264/MPEG-4-AVC standard, which will use the information contained in the POC fields of the video sequence transmitted to put the data back into the initial order. This alternative presents the advantage of being transparent in relation to the video source and the video decoder, and of being applicable to any H.264 type coder which can be adapted for performing the interlacing operations at the group of pictures level.

FIG. 6 represents an exemplary implementation for a group of pictures or GOP comprising 7 frames designated by their initial temporal references {1, 2, 3, 4, 5, 6, 7}. The principle of the mixing operation is to distribute the frames in an appropriate manner so that the coding method adopted is efficacious. Practically, by considering that all the frames Ti preceding a given frame Td can be used as reference for this frame considered, the benefit is to construct the chart for rearranging the frames in a regular manner, for example with the first reference image (necessarily intra-coded) in the middle of the GOP. The second reference level is thereafter placed in the middle of the two subframes situated on either side of the Intra frame and so on and so forth.

In this way, the first coded frame necessarily corresponds to an I or Intra frame, but is not necessarily the first frame of the group of pictures.

For the highest importance frames (first importance level), the coding effectiveness is not optimal, since the separation between the prediction frame and the reference frame in the initial order of the GOP may be larger. This can be compensated for by the fact that the latest frames ought to offer a better level of compression, since they are nearer to the Intra frame (decrease in the distance separating the reference frame and the predicted frame). In the case where one desires absolutely to use an Intra frame as first decoded image, the rearrangement of the frames according to FIG. 7 can readily be adopted.

FIG. 8 represents an example of performance for the total visual rendition obtained with a method according to the prior art (dashed curve) and by implementing the method according to the invention (solid curve) for a grouping of 7 frames. These results correspond to the study of the evolution of the objective measurement of visual rendition or PSNR (Peak Signal to Noise Ratio) for a group of pictures of seven frames. The image considered is the 'Foreman' reference sequence provided by the ITU-T with a refresh rate of 15 frames/s with a target overall bit rate of 64 kbits/s. In the first case (dashed curve), we find the evolution of PSNR obtained over the seven frames by a conventional H.264 coding/decoding, correspond to an order IPPPPPP with a quantization parameter QP equal to 31 for the Intra frame and to 34 for the predicted frames, thereby giving a final bit rate of 63.98 kbits/s. The second curve (solid) shows the evolution of PSNR for the seven frames obtained by application of the invention according to the mixing table given by FIG. 6. The three levels have been respectively coded with the following quantization parameters: QP=31 for the first level (I frame), QP=33 for refinement level 1 (P frames) and QP=38 for refinement level 2, which has made it possible to obtain a final bit rate of 63.03 kbits/s. As envisaged, it is observed on this second curve that the three most important frames have better values of PSNR than those of the other four frames (corresponding to the second refinement level), but also that this is obtained without degradation of the mean PSNR of the sequence since this second sequence presents a mean PSNR of 33.54 dB as against 33.42 dB for the conventional sequence, while this conventional sequence has a slightly greater bit rate. The method described in the invention therefore offers temporal granularity without cost (or indeed with gain), either in terms of bit rate, or in terms of degradation of visual quality.

FIG. 9 represents the generalization of the procedure for groups of pictures or GOPs of different size. In practice, it is possible to implement the procedure in the following manner:

Choose the first reference Intra frame as the middle of the group of pictures or GOP and the remaining parts comprising several frames as sub-groups of pictures or sub-GOPs, for each sub-GOP, repeat the following steps: take as reference frame the middle of the sub-group of pictures GOP and define 2 remaining sub-groups of pictures as the remaining parts. The middle of a group of pictures is for example defined on the basis of the integer part of the value (size of the GOP+1)/2, that is to say as the integer equal to or nearest and less than (size of the GOP+1)/2.

FIG. 9 gives the example for a group of pictures of 15 frames and FIG. 10 for a group of pictures of 12 frames.

Without departing from the scope of the invention, it is possible to generalize this approach and to define a mixing chart corresponding to a division of the rendition between each refinement level by a value n different from 2. This prompts one to place the first Intra frame at a location other than the middle of the group of pictures. In this case, we have a first level which will entail n−1 images regularly distributed, with the I frame one of these n−1 images (for example the first), and the remainder corresponding to predicted images. These n−2 predicted images which appear at the first scalability level have the same importance level as the I frame (they form part of the "frames of highest importance"). We proceed in this way for the following levels, for which the number of reference frames of frames at each level is chosen equal to n−1, leading to a mean value mi=integer part of the value $E[i(\text{size of the GOP}+1)/n]$ for $i=1$, for $\ldots$, $n-1$.

FIG. 10 represents an example for a division of the target rendition n=3 between each level.

In the example, the first frame (7-A) is the Intra while the other 19 frames are P-type predicted frames.

The procedure according to the invention is for example usable in the following applications:

the case where a video decoder is not capable of decoding with a sufficient bit rate the code stream that it receives and chooses to present only a degraded version with a lower bit rate, the case where the coder is informed that the initially available bandwidth is reduced and that it must act accordingly, either by sacrificing some of the last images, or by reducing the visual quality of these last images, which last images turn out to be the least important by construction by virtue of the invention.

The invention claimed is:

1. A method of coding an initial video sequence, the initial video sequence including groups of frames, the method comprising the steps of:

generating a reordered video sequence by, for at least one group of the groups of frames, rearranging an order of the frames according to a frame order mixing table, the rearrangement comprising:

rearranging one of the frames of the group as a first frame of a corresponding group of the reordered video sequence according to the frame order mixing table, the first frame being an Intra (I) frame of the corresponding group according to a video coding standard; and rearranging at least another one of the frames of the group having an order position preceding the one of the frames in the group of the initial video sequence to an order position after the first frame in the corresponding group of the reordered video sequence according to the frame order mixing table, frames of the corresponding group other than the first frame being forward predicted (P) frames of the corresponding group according to the video coding standard; and coding the reordered video sequence by a video encoder to generate a coded video data after performing the rearrangement of the at least one group into the corresponding group according to the frame order mixing table.

2. The method as claimed in claim 1, wherein the coding of the reordered video sequence comprises inserting information, derived from the frame order mixing table, in the coded video data.

3. The method as claimed in claim 1, wherein the coded video data is configured to be transmitted to a video decoder then to a deinterlacer to obtain the initial video sequence.

4. The method as claimed in claim 1, wherein the coding of the reordered video sequence comprises coding the corresponding group while rearranging another group of the groups of frames into another reordered corresponding group.

5. The method as claimed in claim 1, wherein the frame order mixing table is configured for:

rearranging a middle frame of the group of the initial video sequence as the first frame of the corresponding group of the reordered video sequence, remaining frames of the group of the initial video sequence including two sub-groups; and rearranging a middle frame of one of the two sub-groups as a second frame of the corresponding group of the reordered video sequence.

6. A device for coding an initial video sequence, the initial video sequence including groups of frames, the device comprising:

an interlacer configured to generate a reordered video sequence by, for at least one group of the groups of frames, rearranging an order of the frames according to a frame order mixing table, the rearrange of the frames comprising:

rearranging one of the frames of the group as a first frame of a corresponding group of the reordered video sequence according to the frame order mixing table, the first frame being an Intra (I) frame of the corresponding group according to a video coding standard; and rearranging at least another one of the frames of the group having an order position preceding the one of the frames in the group of the initial video sequence to an order position after the first frame in the corresponding group of the reordered video sequence according to the frame order mixing table, frames of the corresponding group other than the first frame being forward predicted (P) frames of the corresponding group according to the video coding standard; and a video coder configured to code the reordered video sequence after the rearrangement of the at least one group into the corresponding group according to the frame order mixing table.

7. A device for coding an initial video sequence, the initial video sequence including groups of frames, the device comprising:

an interlacer configured to generate a reordered video sequence by, for at least one group of the groups of frames, rearranging an order of the frames according to a frame order mixing table, the rearrange of the frames comprising:

rearranging one of the frames of the group as a first frame of a corresponding group of the reordered video sequence according to the frame order mixing table, the first frame being an Intra (I) frame of the corresponding group according to a video coding standard; and rearranging at least another one of the frames of the group having an order position preceding the one of the frames in the initial video sequence to an order position after the first frame in the corresponding group of the reordered video sequence according to the frame order mixing table, frames of the corresponding group other than the first frame being forward predicted (P) frames of the corresponding group according to the video coding standard; and a coder configured to generate coded data by coding the reordered video sequence after performing the rearrangement of the at least one group into the corresponding group according to the frame order mixing table and to insert information, derived from the frame order mixing table, in the coded data.

8. A coding/decoding device comprising the device as claimed in claim 7 and a video decoder.

9. The coding/decoding device as claimed in claim 8, wherein the coding/decoding device further comprises:

a video decoder configured to generate decoded data by decoding the coded data transmitted through a channel; and a deinterlacer configured to retrieve the initial video sequence according to the decoded data.

10. A device for coding an initial video sequence, the initial video sequence including groups of frames, the device comprising:

a coder configured to:

for at least one group of the groups of frames, rearrange one of the frames of the group as a first frame of a corresponding group of the reordered video sequence according to a frame order mixing table, the first frame being an Intra (I) frame of the corresponding group according to a video coding standard;

rearrange at least another one of the frames of the group having an order position preceding the one of the frames in the group of the initial video sequence to an order position after the first frame in the corresponding group of the reordered video sequence according to the frame order mixing table, frames of the corresponding group other than the first frame being forward predicted (P) frames of the corresponding group according to the video coding standard;

generate coded data by coding the reordered video sequence after performing the rearrangement of the at least one group into the corresponding group according to the frame order mixing table; and insert information, derived from the frame order mixing table, in the coded data.

11. The device as claimed in claim 6, wherein the video coder is configured to code the reordered video sequence according to the video coding standard, and the video coding standard is a H.264/MPEG-4 AVC coding standard.

12. The device as claimed in claim 7, wherein the coder is configured to code the reordered video sequence according to the video coding standard, and the video coding standard is a H.264/MPEG-4 AVC coding standard.

13. The device as claimed in claim 8, wherein the coder or the video decoder is in compliance with a H.264/MPEG-4 AVC coding standard.

14. The device as claimed in claim 9, wherein the coder or the video decoder is in compliance with a H.264/MPEG-4 AVC coding standard.

15. The device as claimed in claim 10, wherein the coder is configured to code the reordered video sequence according to the video coding standard, and the video coding standard is a H.264/MPEG-4 AVC coding standard.

16. The method as claimed in claim 1, wherein the coding is performed according to the video coding standard, and the video coding standard is a H.264/MPEG-4 AVC coding standard.

17. The method as claimed in claim 5, wherein the middle frame of the group of the initial video sequence is defined on the basis of an integer part of the value of:

(a number of the frames of the group of the initial video sequence +1)/2.

* * * * *